C. W. STARKER.
DYNAMO ELECTRIC MACHINE.
APPLICATION FILED JUNE 6, 1911.

1,156,639.

Patented Oct. 12, 1915.

WITNESSES:
Fred H Miller

INVENTOR
Charles W. Starker
BY
Wesley G. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,156,639.  Specification of Letters Patent.  Patented Oct. 12, 1915.

Application filed June 6, 1911. Serial No. 631,615.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to dynamo-electric machines and particularly to the stationary members of induction motors.

The object of my invention is to provide a stator that shall be simple and relatively inexpensive in construction and shall embody a laminated core structure, the plates of which are clamped together independently of the frame in which the member is supported.

The stationary member of an induction motor, as usually constructed, comprises a hollow cylindrical frame provided with dove-tail notches or grooves, and laminated cores, the plates or laminæ of which are provided with dove-tail projections to fit into the notches or grooves in the frame, and are individually placed in the frame and clamped together by end plates which are held in position by keying them to the frame.

According to my present invention, I provide a stationary member comprising a hollow cylindrical frame, having a smooth bore, a core member, the plates of which are clamped together independently of the frame, and a simple means for centering the core member in the frame. I am thus able to utilize one size and style of frame for a large number of machines of widely different capacities.

In order to accomplish the desired results and to reduce the cost of the machine as much as possible, I provide a hollow wrought-steel frame, a pressed steel base or supporting member and a particularly simple core structure, the laminæ of which are bolted together between end plates having the same form and outline as the laminæ and preferably made of magnetizable material.

Figure 1:
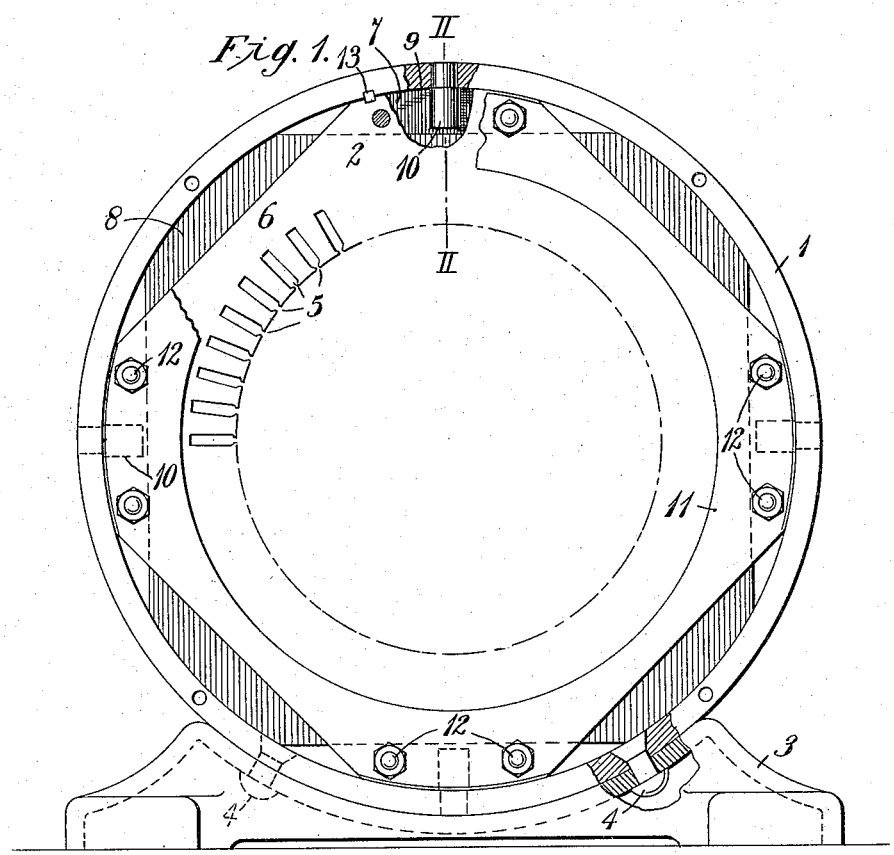
Figure 2:
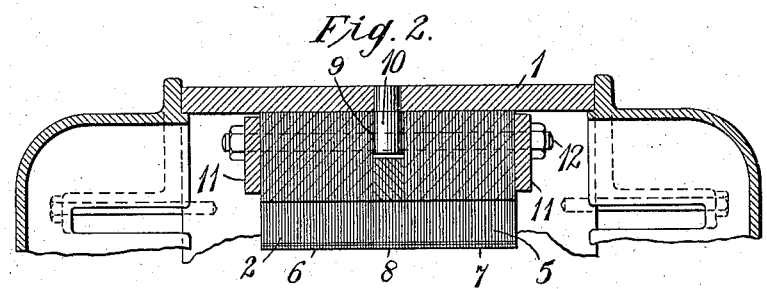

Figure 1 of the accompanying drawings is an end elevation, partially in section, of an induction motor stator constructed in accordance with my invention. Fig. 2 is a sectional view on line II—II of Fig. 1.

Referring to the drawing, the structure here shown comprises a hollow cylindrical frame 1 which is preferably formed by bending a rectangular steel plate of proper dimensions, a core member 2 which is supported in the frame 1, and a base or supporting member 3, which is preferably formed of pressed steel and is secured to the frame 1 by rivets 4.

The core member 2 comprises a plurality of plates which are substantially square in outline and from which a central disk has been removed. The corners of the square are rounded to fit into the frame 1 and their inner edges are provided with notches 5 to receive the coils (not shown), in the usual manner.

The plates of which the core member is composed are assembled within the frame 1 in two principal outer groups 6 and 7 and an intermediate group 8 composed of relatively few plates, as shown in Fig. 2 of the drawings. The plates of which the groups 6 and 7 are composed are correspondingly located but the plates of the group 8 are skewed, relative to the plates of the other groups, through an angle of 45°. By this means, four grooves 9 are located symmetrically relative to the frame 1 into which centering pins 10 project. The centering pins may be of any suitable form, being preferably of steel and fitted into the frame 1, as shown in the drawings. The laminæ are clamped together between the end plates 11 by means of rivets or bolts 12 and are prevented from shifting circumferentially in the frame by means of a key 13.

When the end rings, which clamp the laminæ together, are held in position by means of segmental keys located in circumferential grooves in the frame, in a well known manner, either various sizes and styles of rings must be employed in order to adapt different sizes of core members to the same frame, or the location of the circumferential key grooves must be changed for each different size of core member. On the other hand, the end rings and the frame of my invention may be utilized without change for core members of widely different sizes.

It will be evident to those skilled in the art that the stator of my invention may be manufactured in large quantities with very much less expense than corresponding structures known in the prior art.

I claim as my invention:

1. A dynamo-electric machine comprising a smooth-bore frame having inwardly projecting pins and a supporting base, a laminated core member provided with means independent of the frame for clamping its laminæ together and with recesses to receive the inwardly projecting pins.

2. A dynamo-electric machine comprising a hollow cylindrical frame having inwardly projecting side pins and a laminated core member having means independent of the frame for clamping the laminæ together and recesses to receive said pins.

3. A dynamo-electric machine comprising a hollow cylindrical frame having a plurality of inwardly projecting pins and a laminated core structure having means independent of the frame for clamping the laminæ together and grooves in its outer surface to receive said inwardly projecting pins.

4. A dynamo-electric machine comprising a hollow cylindrical frame having a plurality of inwardly projecting pins, a core structure comprising a plurality of similar plates disposed in skewed or staggered groups to provide grooves in its outer surface for the reception of said inwardly projecting pins.

5. A dynamo-electric machine comprising a substantially cylindrical frame having internal projections, and a core member comprising substantially rectangular laminæ some of which are circumferentially displaced to form lateral grooves to receive said internal projections.

6. In a dynamo-electric machine, the combination with a substantially cylindrical frame having a plurality of spaced internal projections, of a core member comprising laminæ of substantially rectangular external contour, some of which are circumferentially displaced to form recesses to receive said internal projections, said core member engaging the inner face of the cylindrical frame.

7. In a dynamo-electric machine, the combination with a substantially cylindrical frame having four uniformly spaced internal projections, of a core member comprising substantially rectangular laminæ some of which are circumferentially displaced to form recesses with which said internal projections engage.

In testimony whereof, I have hereunto subscribed my name this 23rd day of May, 1911.

CHARLES W. STARKER.

Witnesses:
R. P. SCHOYER,
B. B. HINES.

Copies of this patent may be obtained for five cents each, by addressing the "Commissioner of Patents, Washington, D. C."